United States Patent [19]

Urrutia

[11] Patent Number: 5,501,509
[45] Date of Patent: Mar. 26, 1996

[54] FRAME ASSEMBLY FOR A VEHICLE SEAT

[75] Inventor: Alvaro E. Urrutia, Knoxville, Tenn.

[73] Assignee: National Seating Company, Vonore, Tenn.

[21] Appl. No.: 235,429

[22] Filed: Apr. 29, 1994

[51] Int. Cl.[6] .................................................. A47C 7/20
[52] U.S. Cl. ................... 297/452.18; 297/452.2; 297/483
[58] Field of Search ............................. 297/452.18, 483, 297/452.20, 370, 371

[56] References Cited

U.S. PATENT DOCUMENTS

| | | | |
|---|---|---|---|
| 4,623,114 | 11/1986 | Nishiro | 297/452.18 X |
| 4,673,215 | 6/1987 | Yokoyama | 297/452.18 |
| 4,804,226 | 2/1989 | Schmale | 297/483 X |
| 4,850,644 | 7/1989 | Kazaoka et al. | 297/452.18 X |
| 5,123,706 | 6/1992 | Granzow et al. | 297/452.18 |
| 5,246,271 | 9/1993 | Boisset | 297/452.2 X |
| 5,310,154 | 5/1994 | Ueda et al. | 297/452.18 X |
| 5,318,341 | 6/1994 | Griswold et al. | 297/452.18 X |
| 5,362,132 | 11/1994 | Griswold et al. | 297/452.20 X |
| 5,364,167 | 11/1994 | Aoki et al. | 297/452.18 |

*Primary Examiner*—Peter M. Cuomo
*Assistant Examiner*—Rodney B. White
*Attorney, Agent, or Firm*—Michael E. McKee

[57] ABSTRACT

A frame assembly for a vehicle seat includes a seat-supporting section and a back-supporting section which are joined in a manner which accommodates the attachment thereto of a seat belt assembly so that the seat belt assembly need not be attached to the body of the vehicle within which the seat is used in order to pass load test requirements. The seat-supporting section includes two elongated side members which are fixedly secured to one another in a substantially parallel relationship, and the back-supporting section includes a generally vertically-oriented beam disposed on one side of the seat and a brace for stabilizing the beam in its vertical orientation. The frame also includes gusset members for joining the back-supporting section to the seat-supporting section at the corners of the frame. During loading tests performed on a seat utilizing the frame, the frame components cooperate to reduce the likelihood of deformation of the components and so that an appreciable amount of the loading forces are absorbed by the beam and the elongated side members of the assembly.

20 Claims, 3 Drawing Sheets

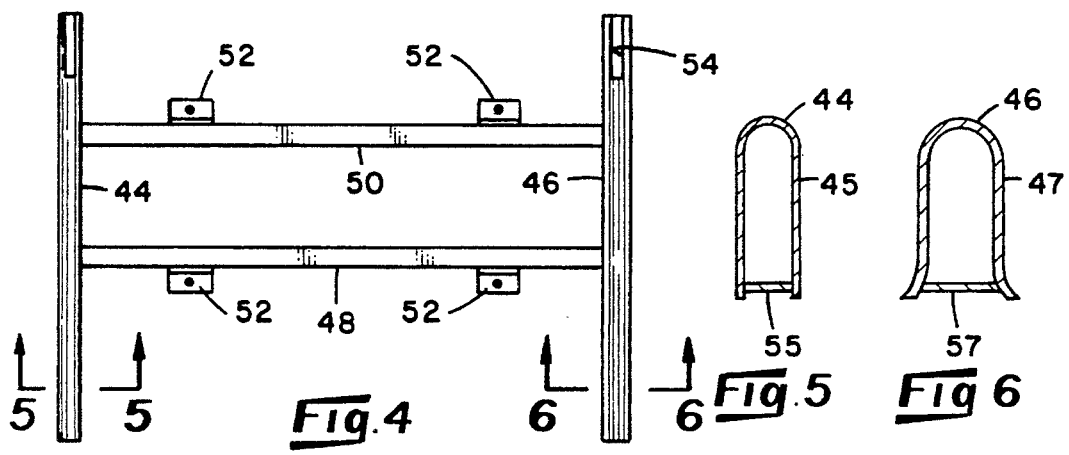
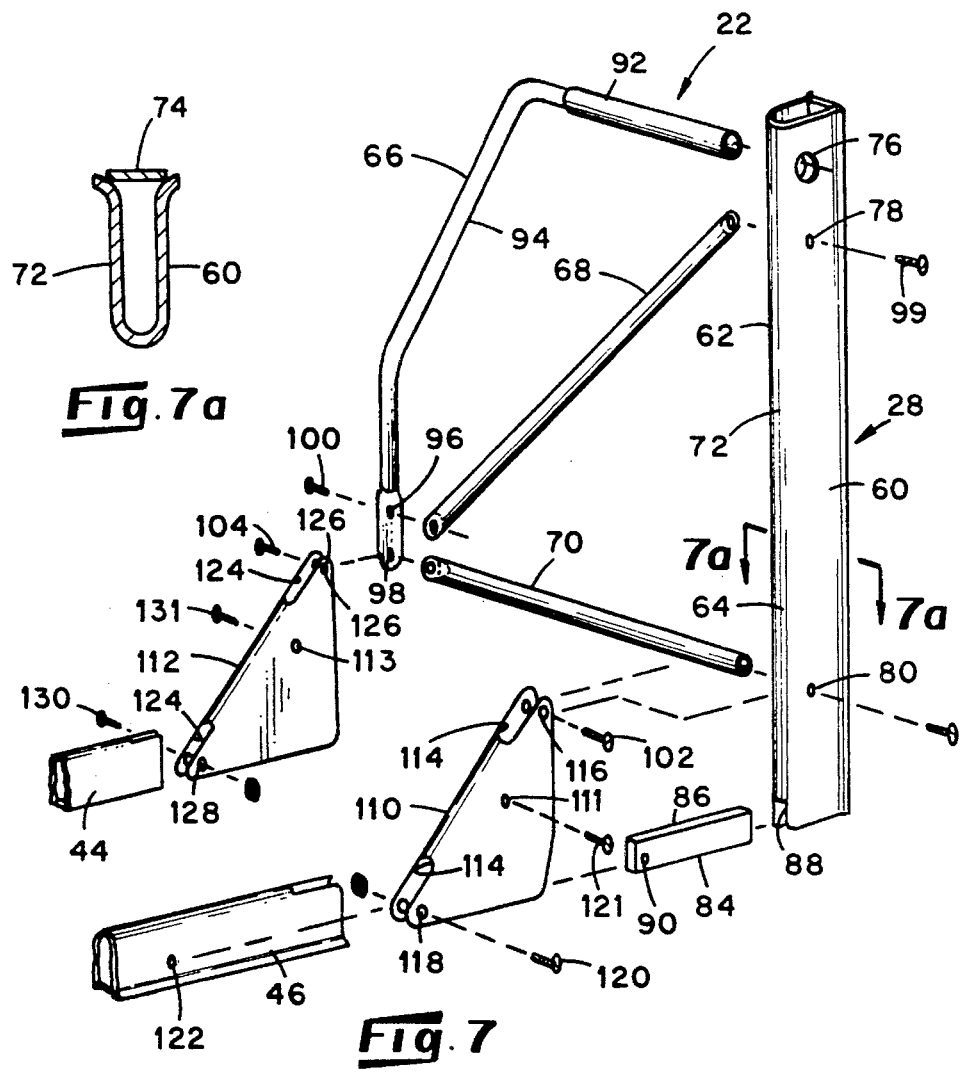

FRAME ASSEMBLY FOR A VEHICLE SEAT

BACKGROUND OF THE INVENTION

This invention relates generally to seats for vehicles and relates, more particularly, to the construction of a frame for a vehicle seat.

In a vehicle in which a shoulder belt is used in conjunction with a seat belt for spanning the torso of the occupant, one end, i.e. the upper end of the shoulder belt, is commonly attached to the body of the vehicle at a location adjacent the occupant's shoulder. By attaching the shoulder belt to the vehicle body, the vehicle body, rather than the seat or its frame, absorbs the loads to which the seat is exposed during a crash, i.e. a head-on crash, of the vehicle.

It would be desirable to attach the upper end of the shoulder belt to the frame of the seat at, for example, a location adjacent the occupant's shoulder, to render the shoulder belt more comfortable to the occupant and to facilitate the installation of the seat and the accompanying belts within a vehicle. However, loading tests to which vehicle seats are commonly subjected require that a frame of the seat be much stronger when a shoulder belt is attached to the seat frame than is the case when the shoulder belt is attached to the vehicle body. Heretofore, efforts to render the seat frame stronger have resulted in designs which are either too bulky, heavy or costly to be practical from a manufacturing standpoint.

Accordingly, it is an object of the present invention to provide a new and improved frame assembly for a vehicle seat to which the upper end of a shoulder belt can be secured.

Another object of the present invention is to provide such an assembly which is uncomplicated and relatively lightweight in construction and effective in operation.

SUMMARY OF THE INVENTION

This invention resides in a frame assembly for a vehicle seat having a front, a back and two opposite sides.

The frame assembly includes a seat-supporting section including two elongated side member arranged so as to extend between the front and the back of the seat. One of the side members is disposed adjacent one side of the seat, and the other of the side members is disposed adjacent the other side of the seat. The frame assembly also includes a back-supporting section including an elongated beam disposed adjacent the back and the one side of the seat so that the longitudinal axes of the one side member and the beam are coplanar. The beam is arranged in an angular relationship with the one elongated member so as to extend generally upwardly therefrom and so that the beam is provided with an upper end portion and a lower end portion. The back-supporting section also includes bracing means which extend between the upper end portion and a predetermined location disposed adjacent the back and the other side of the seat. Gusset means are also provided for joining the lower end portion of the beam to the one elongated side member and for joining the bracing means to the other elongated side member.

BRIEF DESCRIPTION OF THE DRAWINGS

FIG. 4 is a top plan view of the seat-supporting section shown in FIG. 3.

FIG. 5 is a cross-sectional view taken along line 5—5 of FIG. 4.

FIG. 6 is a cross-sectional view taken along line 6—6 of FIG. 4.

FIG. 7 is a perspective view of the back-supporting section of the frame of the FIG. 1 seat.

FIG. 7a is a cross-sectional view taken along line 7a—7a of FIG. 7.

DETAILED DESCRIPTION OF THE ILLUSTRATED EMBODIMENTS

Figure 1:
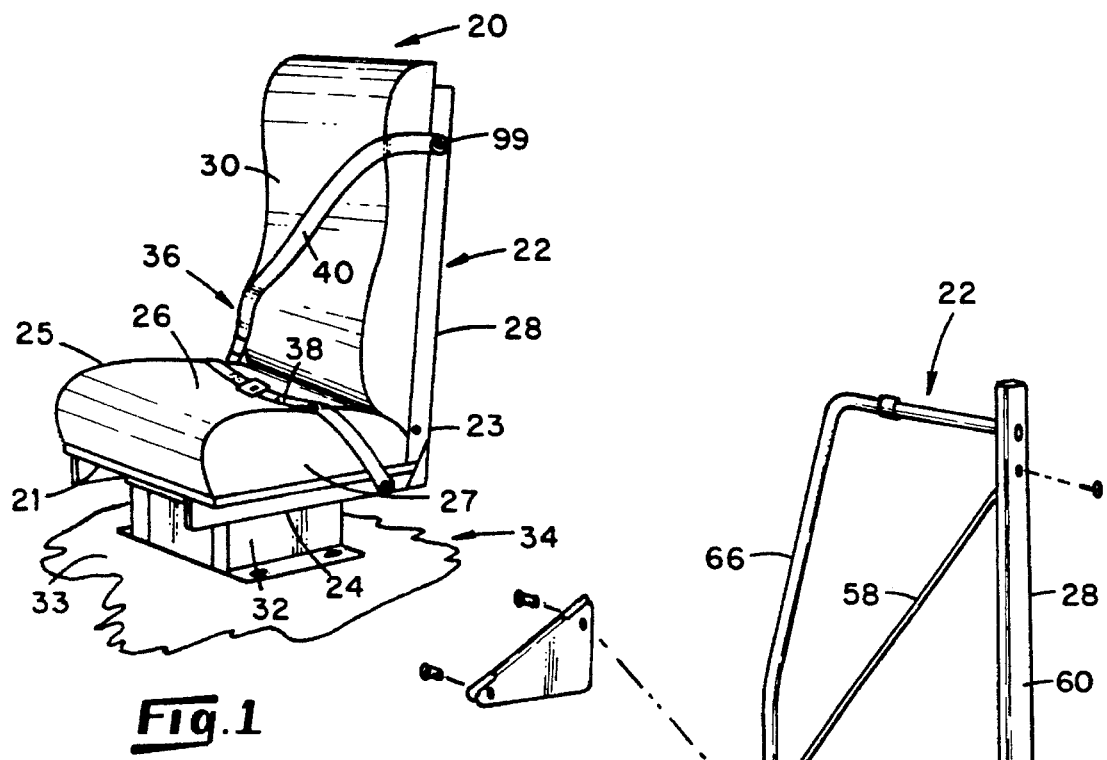
FIG. 1 is a perspective view of an embodiment of a vehicle seat.
Figure 2:
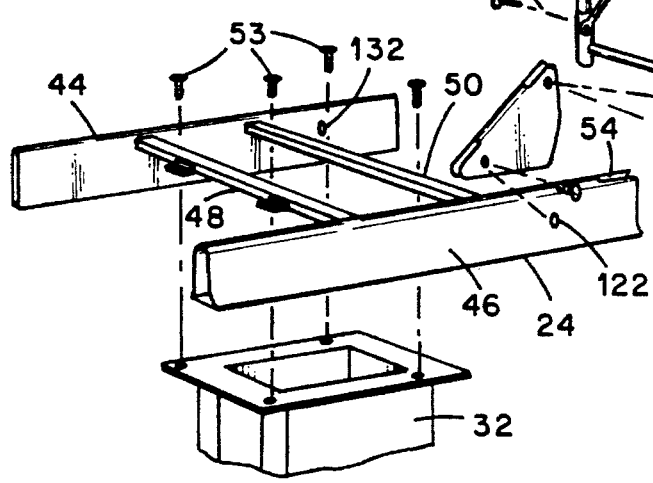
FIG. 2 is a perspective view of the frame of the FIG. 1 seat, shown exploded.

Turning now to the drawings in greater detail, there is shown in FIGS. 1 and 2 an embodiment of a vehicle seat, generally indicated 20, including a frame, or frame assembly, 22 within which features of the present invention are embodied. The frame 22 includes a substantially horizontally-disposed seat-supporting section 24 upon which a seat cushion 26 is secured and a back-supporting section 28 to which a back cushion 30 is secured. The frame 22 is mounted upon a base 32 which can include a suspension system, and the base 32, in turn, is fixedly secured to the floor 33 of a vehicle 34. In conjunction with the seat 20, there is provided a seat belt assembly 36 including a lap, or seat, belt 38 for spanning the lap of an occupant seated upon the seat 20 and a torso, or shoulder, belt 40 for spanning the torso of the seat occupant. As will be apparent herein, the construction of the seat frame 22 provides the seat 20 with sufficient strength so that when the seat belt assembly 36 is secured to the frame 22 and stringent load tests are applied to the seat 20, the seat 20 withstands the tests.

The seat 20 includes a front 21, a back 23, a right side 25 and a left side 27 (as viewed by an occupant seated in the seat 20) and is illustrated herein as a bucket-type seat which is positionable behind the steering wheel of a vehicle, such as a truck or automobile, having a steering wheel on the left side of the vehicle. Accordingly, in the depicted seat 20, the left side 27 of the seat can be considered as the outboard side of the seat 20 while the right side 25 can be considered as the inboard side of the seat 20.

With reference to FIGS. 2–6, the seat-supporting section 24 includes a pair of elongated members 44, 46 which are arranged in a generally parallel relationship and wherein each member 44 or 46 extends between the front and the back of the seat 20. The members 44, 46 are fixedly secured to one another by means of a pair of cross bars 48, 50 having ends which are joined, as with welds, to the members 44, 46 so that the cross bars 48, 50 are maintained in a substantially parallel relationship. The seat section 24 also includes a pair of lugs 52 which are attached to each cross bar 48 or 50 and which each have a vertically-opening aperture for accommodating the securement of the seat section 24 atop the base 32 with bolts 53. Alternatively, the seat-supporting section 24 can be secured upon tracks (not shown) which are interposed between the seat section 24 and the base 32.

Figure 3:
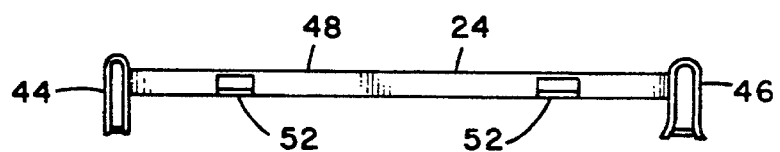
FIG. 3 is a front elevational view of the seat-supporting section of the frame of the FIG. 1 seat.

The length of each elongated member 44 or 46 corresponds generally with the length of the seat cushion 26 (as measured from front to back) intended to be supported by the seat section 24. As shown in FIG. 5, the elongated member 44 includes a section 45 which is substantially U-shaped in cross section and a plate 55 which is attached, as with welds across the opening of the U of the section 45. Similarly and as shown in FIG. 6, the elongated member 46 includes a section 47 which is substantially U-shaped in cross section and a plate 57 which is attached, as with welds, across the opening of the U of the section 47. As tests are performed upon the seat 20 and the generated loading forces are exerted upon the seat frame 22 to which the upper end of the shoulder belt 40 is attached, the elongated member 46 is exposed to a larger proportion of the loading forces than is the elongated member 44. Accordingly, the member 44 need not be as strong (or as large or as heavy) as is the member 46 and is advantageous in this respect. As shown in FIGS. 2 and 3, the member 46 also includes a slot 54 formed in the bridge of its U and adjacent the back of the seat 20 for a reason apparent herein. Each of the aforedescribed component of the seat-supporting section 24 is constructed of a suitable material, such as steel.

With reference to FIG. 7, the back-supporting section 28 includes an elongated beam 60 and a plurality of members including a frame segment 66 and braces 68, 70 for joining the beam 60 to the seat-supporting section 24. The beam 60 includes an upper end portion 62 and a lower end portion 64 and is disposed on the same side, i.e. the outboard side, of the seat 20 as is the elongated member 46. As best shown in FIG. 7a, the beam 60 includes a section 72 which is substantially U-shaped in cross section (and arranged so that its U opens rearwardly of the seat 20) and a plate 74 which is joined, as with welds, to the section 72 so as to span the opening of the U thereof. The upper end portion 62 of the beam 60 is provided with through-openings 76 and 78 as shown in FIG. 7, and the lower end portion 64 is provided with through-opening 80 as shown in FIG. 7.

Figure 12:
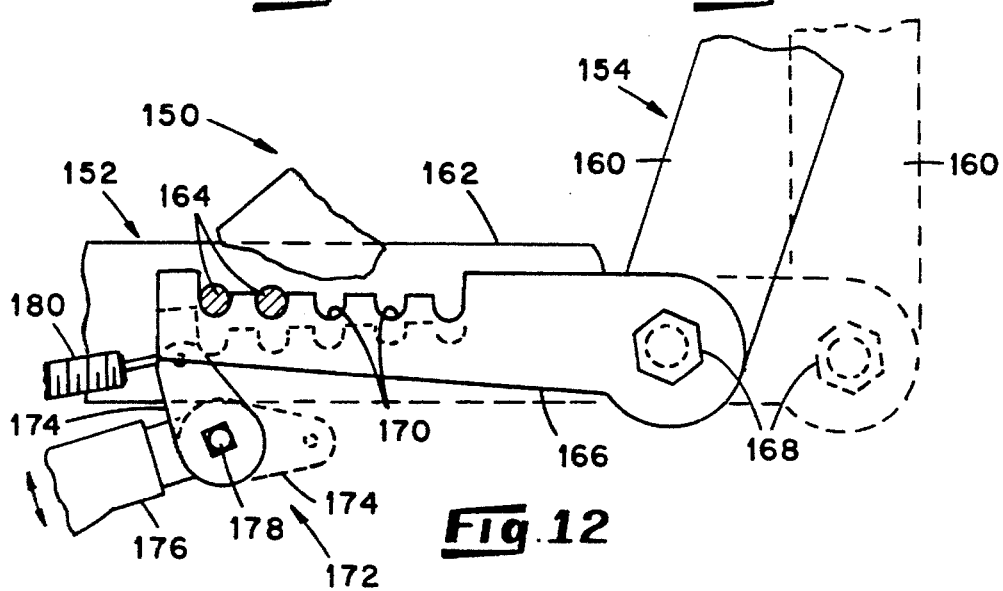
FIG. 12 is a fragmentary elevational view of an alternative embodiment of a seat frame.

To simulate a bar (or plate) of a seat-reclining mechanism as described hereinafter in connection with the embodiment of FIG. 12, there is provided a bar 84 which is secured at one end to the lower end portion 64 of the beam 60 and has an opposite end 86 which protrudes from the beam 60. To this end, the beam section 72 is provided with an opening 88 (FIG. 7) adjacent the lowermost end of the beam 60 for accepting the bar 84 inserted endwise therein, and the inserted end of the bar 84 is attached, as with welds, to adjacent parts of the beam 60 to secure the bar 84 and beam 60 in an L-shaped arrangement. The protruding end of the bar 84 is provided with a through-opening 90 for attachment to the seat-supporting section 24 in a manner described herein.

The frame segment 66 of the depicted frame 22 is tubular in cross section along a major segment of its length and is arcuate in form. More specifically, the frame segment 66 includes a linear tube 92 (FIG. 7) which extends from the upper end portion 62 of the beam 60 and is joined to a second, arcuate-shaped tube 94 of reduced cross section. The tube 92 is positioned within and welded about the opening 76 provided within the upper end portion 62 of the beam 60 to secure the tube 92 thereto, and the tubes 92 and 94 are welded together in an end-to-end fashion. Preferably, the tubes 92 and 94 are welded together so that a portion of the tube 94 is positioned within the tube 92. In addition, the end of the tube 94 opposite the tube 92 is suitably shaped, i.e. flattened, and provided with a pair of openings 96, 98 to accommodate the attachment of the frame segment 66 to the braces 68, 70 and to the seat-supporting section 24 in a manner described herein.

With reference still to FIG. 7, the brace 68 includes a tube which is capped at each end with a steel cap having a hole formed therein and a nut positioned within the tube. As will be apparent herein, the nuts of these caps threadably accept the shanks of bolts used secure the brace 68 to the remainder of the frame 22. In this connection, one end of the brace 68 is positioned adjacent one side of the beam along the upper end portion thereof and is attached thereto with a bolt 99 which extends through the opening 78 and the aligned opening provided in the corresponding cap. The other end of the brace 68 is positioned adjacent the lowermost end of the frame segment 66 and attached thereto with a bolt 100 inserted through the aligned opening 96 of the frame segment 66 and the opening of the corresponding cap. It follows that the brace 68 extends diagonally across the back-supporting section 28 from a location adjacent the upper end portion 62 of the beam 60 to a location adjacent the rear of the seat-supporting section 24, as best shown in FIG. 8.

Figure 8:
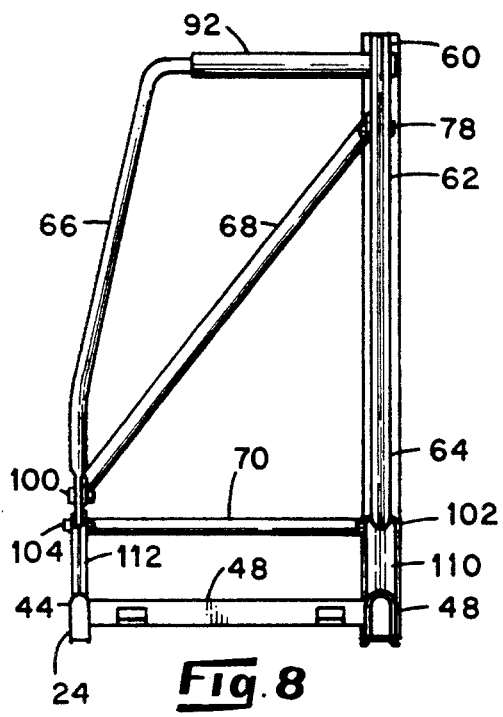
FIG. 8 is a front elevational view of the frame of the FIG. 1 seat, shown in an assembled condition.

With reference to FIGS. 7 and 8, the brace 70 (as does the brace 68) also includes a tube which is capped at each end with a steel cap having a hole formed therein and a nut positioned within the tube to accommodate attachment between the lower end portion 64 of the beam 60 and the lower end of the frame segment 66. More specifically, one end of the brace 70 is positioned adjacent one side of the beam 60 along the lower end portion 64 thereof and is attached thereto with a bolt 102 which extends through the opening 80 and the aligned opening of the corresponding flange. The other end of the brace 70 is positioned adjacent the lowermost end of the frame segment 66 and attached thereto with a bolt 104 inserted through the aligned opening 98 of the brace 70 and the opening of the corresponding cap. As best shown in FIG. 8, the brace 70 extends substantially horizontally across the back-supporting section 28 when attached to the remainder of the components of the back section 28. Each of the aforedescribed components of the back-supporting section 28 is constructed of a suitable material, such as steel.

Figure 11:
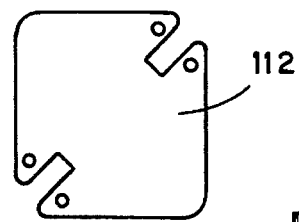
FIG. 11 is a plan view of one of the gussets of the FIG. 2 frame assembly, when spread into a planar condition.

For securement of the back-supporting section 28 to the seat-supporting section 24, the frame 22 includes a pair of gusset members 110, 112 (FIG. 7) which are attached between so as to span the corners of the frame 22. To this end, each gusset member 110 or 112 is formed of a relatively light gauge piece of steel which has been shaped from a substantially square piece as exemplified by the blank of the member 112 shown in FIG. 11, and then notched and folded into a substantially triangular form (as viewed from the side) so as to be positionable over the rearwardmost end of an elongated member 44 or 46 and a corresponding part of the back-supporting section 28. More specifically, one gusset member 110 is positionable over the rearwardmost end of the elongated member 46 and about the lowermost end of the beam 60. Accordingly, the notches, indicated 114 in FIG. 7, formed in the gusset member 110 are sized to accept the portion of the elongated member 46 or beam 60 positioned therein. For attachment of the gusset member 110 to the elongated member 46 and beam 60, the gusset 110 is provided with openings 116 for acceptance of the bolt 102 inserted therethrough and is provided with openings 118 for acceptance of a bolt 120 inserted therethrough and through the aligned opening 90 of the bar 84 (to thereby secure the bar 84 to the elongated member 46) and appropriately-provided openings 122 (FIGS. 2 and 7) formed adjacent the rear of the elongated member 46. It will be understood that when attaching the beam 60 to the gusset member 110 and side member 46, the beam 60 is accepted by the slot 114 provided in the gusset member 110.

Similarly, the other gusset member 112 (FIG. 7) is positionable over the rearwardmost end of the elongated member 44 and about the lowermost end of the frame segment 66. Accordingly, the notches, indicated 124, formed in the gusset member 112 are sized to accept the portion of the elongated member 44 or frame segment 66 positioned therein. For attachment of the gusset member 112 to the elongated member 44 and frame segment 66, the gusset 112 is provided with openings 126 for acceptance of the bolt 104 inserted therethrough and is provided with openings 128 for acceptance of a bolt 130 inserted therethrough and through appropriately-provided openings 132 (FIG. 2) formed adjacent the rear of the elongated member 44.

Figure 9:
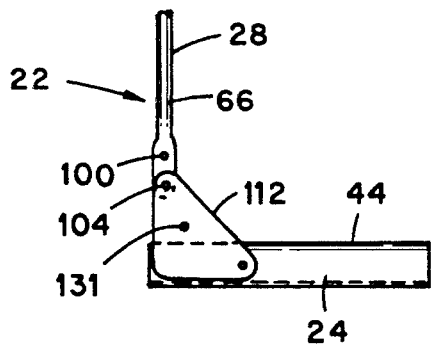
FIG. 9 is a side elevational view of a fragment of the frame of the FIG. 1 seat as seen from the left in FIG. 8.
Figure 10:
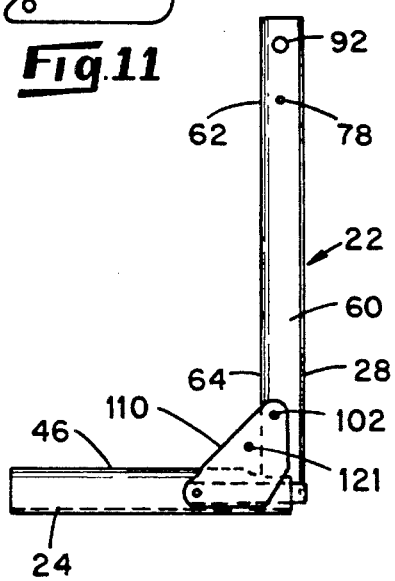
FIG. 10 is a side elevational view of the frame of the FIG. 1 seat as seen from the right in FIG. 8.

In its assembled condition as shown in FIGS. 8–10, the frame 22 assumes somewhat of an L-shape wherein one leg of the L, i.e. the seat-supporting section 24, is capable of supporting the seat cushion 26 (FIG. 1) and the other leg of the L, i.e. the back-supporting section 28, is capable of supporting the back cushion 30. The seat and back cushions 26 and 30 are securable to the seat and back sections 24 and 28 in a conventional manner.

It is a feature of the frame 22 that the beam 60 and elongated side member 46 are arranged so that the longitudinal axes thereof are substantially coplanar. In the depicted frame 22, the longitudinal axes are arranged in a common vertical plane. In addition, the ends of the braces 68 and 70 are joined to the other side member 44, by means of the gusset member 112, so that these joined ends of the braces 68 and 70 act at a location which is substantially coplanar, i.e. in a common vertical plane, as the longitudinal axis of the side member 44. When forwardly-directed loading forces are exerted upon the upper end portion of the beam 60, the braces 68 and 70 cooperate with the assemblage including the gusset member 112 and elongated side member 44 to limit the sideways bending of the beam 60, as well as the torsional effects upon the gusset 110 and the side member 46. Thus, the components of the frame 22 help to maintain the beam 60 in an aligned condition with the elongated side member 46 during loading tests to increase the load-absorbing capacity of the beam 60 and side member 46 arrangement. Moreover, the bolted arrangement of the gusset 112 and the braces 68 and 70 permit the braces 68 and 70 to pivot relative to the gusset member 112 during a loading test so that the forwardly-directed bending forces to which the seat-supporting section 28 are exposed are absorbed by the beam 60 (which because of its rigid attachment to the gusset member 110 and the depth of the U of its section 72 is better adapted to absorb these forces).

In the depicted seat 20, the right and left sides of the seat belt 38 are securable to the gussets 110 and 112 by way of the bolts 121 and 131, respectively, which are accepted by openings 111 and 113 formed in the gussets 110 and 112. Thus, forces which act upon the seat belt 38 during a loading test are transferred to the gussets 110 and 112 at locations thereon disposed to the sides of the seat frame 22. The shoulder bolt 40, on the other hand, is securable at its upper end to the upper end portion of the beam 60 by way of the bolt 99 while the lower end of the shoulder belt 40 is securable to the gusset member 112. Preferably, the shoulder and seat belts are formed as a single belt which has been looped through a buckle (not shown) which is connectible to the gusset 112 by means of the bolt 131.

For exemplary purposes, the following dimensions of the frame 22 are provided as follows. The length of each of the elongated members 44 and 46 is about 19.75 inches; the elongated member 44 is formed of 11 gauge sheet steel (0.120 inches thick) which has been formed in a press operation to provide a height (of its U) of about 2.75 inches and a thickness (as measured across its U) of about 0.65 inches. The section 47 of the elongated member 46 is formed of 11 gauge sheet steel which has been formed to provide a height (of its U) of about 2.75 inches and a thickness (as measured across its U) of about 1.25 inches. The length of the beam 60 is about 34.0 inches, the distance as measured from the lowermost end of the beam 60 to the opening 78 is about 28.5 inches; the distance as measured from the lowermost end of the beam 60 to the beam opening 76 is about 32.0 inches; the section 72 of the beam 60 has been formed of 11 gauge sheet steel (0.120 inches thich) which has been formed in a press operation to provide a depth (of its U) which decreases as a path is traced upwardly therealong from about 2.75 inches to about 2.0 inches and a thickness (as measured across its U) of about 1.0 inches. The length of the diagonally-disposed brace 68 is about 26.125 inches; the length of the horizontally-disposed brace 70 is about 16.0 inches; and each pair of openings provided in each of the gusset members 110 and 112 is about 6 inches apart. In this example, steel having a minimum yield strength of 50,000 pounds is used to construct the frame components.

Loading tests have been conducted upon the seat 20 whose components of the frame 22 have the foregoing dimensions, and the seat 22 withstood the forces to which it was exposed without any appreciable deformation or failure of its components. During such tests, a force of about 3,000 pounds was exerted in a forwardly direction upon a point located substantially midway along the shoulder belt 40, a force of about 3,000 pounds was exerted in a forwardly and slightly upwardly direction upon a point located substantially midway along the length of the seat belt 38, and a force equal to about twenty times the weight of the seat 20 was exerted in a forwardly direction upon the base 32.

The seat 20 is advantageous in that it accommodates the attachment of the seat bolt assembly 36 to its frame 22 rather than require, to meet loading tests, that the seat belt assembly 36 be anchored directly to the body of the vehicle in which the seat is used. In addition, by anchoring the seat belt assembly 36 to the seat 20, the points at which the belt assembly 36 is anchored shift in conjunction with the seat structure to maintain a constant belt-to-body angle in any seat position, reduces friction of the belt assembly 36 on the occupant's body and thus contributes to the occupant's comfort while in the seat 20. Furthermore, by anchoring the upper end of the shoulder belt 40 to the beam 60, rather than the vehicle body, the belt 40 can be made shorter to reduce the amount of belt stretch, in the event of a crash, and thereby reduce the amount of forward head excursion.

Still further, the attachment of the seat belt assembly 36 to the seat 20 provides advantages relating to the vehicle manufacture and safety. For example, since the liability for proper seat belt installation commonly rests with the seat manufacturer, the quality control of the overall assembly process is improved. Moreover, since seat-anchoring tether belts are obviated with this frame design, the chances of occupant injury due to inadequate tether belt installation is eliminated.

It will be understood that numerous modifications and substitutions can be had to the aforedescribed embodiment without departing from the spirit of the invention. For example, although the aforedescribed frame assembly 22 has been shown and described as including a beam 60 to which a bar 84 is rigidly secured, an frame assembly in accordance with the broader aspects of the invention can include an alternative beam/bar assembly. For example, there is shown in FIG. 12 a frame assembly, generally indicated 150, for a vehicle seat including a seat-supporting section 152 and a back-supporting section 154. The back-supporting section 154 includes a beam 160 having a cross section which is comparable to that of the beam 60 of the frame 22 of FIGS. 1–10, and the seat-supporting section 152 includes an elongated side member 162 having a hollow cross section whose longitudinal axis is arranged in about the same vertical plane as that of the longitudinal axis of the beam 160. Extending laterally through the side member 162 are a pair of pins 164, and there is pivotally attached to the lower end of the beam 160 an elongated plate 166 which is permitted to pivot relative to the beam 160 about a pivot pin, or bolt 168. The upper edge of the plate 166 is provided with a plurality of spaced notches 170 for accepting the pins 164 when positioned against the pin sides.

Associated with the frame 150 is a cam assembly 172 including a cam 174 and a manually-operable handle 176 adapted to pivot about a pin 178 mounted in a fixed position relative to the side member 162. The cam 174 is positioned against the lower edge of the plate 166 and biased there-against by means of a tension spring 180 so that as long as the handle 176 is positioned in its lowermost position, the cam 174, by way of the spring 180, maintains the forward edge of the plate 166 in a raised position at which the pins 164 are accepted by, and are thereby interlocked with, the notches 170 of the plate 166. By manually lifting the handle 176 to a raised position, the cam 174 is pivotally moved to a condition at which the forward edge of the plate 166 is permitted to fall to a position at which the plate 166, and the lower end portion of the beam 160 attached thereto, can be shifted forwardly or rearwardly with respect to the pins 164 so that upon release of the handle 176, alternative notches 170 of the plate 166 become cooperatively interlocked with the pins 164. It follows that as the plate 166 is shifted forwardly or rearwardly relative to the pins 164 between alternative positions, the lower end portion of the beam 160 is shifted forwardly or rearwardly by a corresponding amount, and that the plate 166 and cam assembly 172 accommodates an adjustment of the position, e.g. the angle of recline, of the back-supporting section 154 relative to the seat-supporting section 152.

Accordingly, the aforementioned embodiment is intended for the purpose of illustration and not as limitation.

I claim:

1. A frame assembly for a vehicle seat having a front, a back a lower back corner and two opposite sides including one side of the seat and the other side of the seat, the assembly comprising:

a seat-supporting section including two elongated side members including one side member and the other side member and arranged so as to extend between the front and the back of the seat and so that each side member is provided with a back end, the one side member being disposed adjacent the one side of the seat and the other side member being disposed adjacent the other side of the seat and each of the two side members having a longitudinal axis;

a back-supporting section including an elongated beam having a longitudinal axis wherein the elongated beam is disposed adjacent the back and the one side of the seat so that the longitudinal axis of the one side member and the longitudinal axis of the beam are coplanar, the beam being arranged in an angular relationship with the one elongated side member so as to extend generally upwardly therefrom and so that the beam is provided with an upper end portion, a lower end and a lower end portion, the back-supporting section also including bracing means which extend between the upper end portion and a predetermined location disposed adjacent the back and the other side of the seat; and gusset means for joining the lower end portion of the beam to the one elongated side member and for joining the bracing means to the other elongated side member wherein the gusset means includes a first corner-strengthening gusset disposed adjacent the one side of the seat for spanning the lower back corner thereof and is attached to the lower end portion of the beam at a first location therealong which is spaced from the lower end thereof and to the one side member at a second location therealong which is spaced from the back end thereof so that the first gusset maintains a preselected and nonadjustable spacing between the first and second locations, and the gusset means further includes a second corner-strengthening gusset disposed adjacent the other side of the seat for spanning the lower back corner thereof and is attached to the bracing means at the predetermined location and to the other side member at another location therealong which is spaced from the back end thereof so that the second gusset maintains a preselected and nonadjustable spacing between the predetermined location and the another location.

2. The assembly as defined in claim 1 wherein longitudinal axis of the beam and the one elongated side member are oriented in a vertical plane.

3. The assembly as defined in claim 1 wherein the predetermined location and the longitudinal axis of the other elongated side member are arranged in a plane which is substantially parallel to the plane in which the longitudinal axes of the one elongated side member and the beam are oriented.

4. The assembly as defined in claim 3 wherein the bracing means includes a linear member which extends along a diagonal path from the upper end portion of the beam to the predetermined location disposed adjacent the opposite side of the seat and wherein the diagonal path and the longitudinal axis of the beam are substantially coplanar.

5. The assembly as defined in claim 3 wherein the bracing means cooperate with the gusset means and the elongated side members to limit sidewise effects on the beam and torsional effects on the gusset means and the one side member which could otherwise result when the upper end portion of the beam is exposed to sideways-directed forces and so that the beam is maintained in substantially coplanar alignment with the longitudinal axis of the one elongated side member.

6. The assembly as defined in claim 1 wherein the beam is of greater size and strength than that of the bracing means.

7. The assembly as defined in claim 1 wherein the one elongated side member is of greater size and strength than that of the other elongated side member.

8. The assembly as defined in claim 1 wherein each of the beam and the one elongated side member length and each of the beam and the one elongated side member includes a major section which extends along the length thereof and is substantially U-shaped in cross section and a plate which extends along the length thereof wherein the U of the major section has two legs and an opening therebetween and the plate is attached so as to cover the opening of the U of the major section.

9. The assembly as defined in claim 1 further including a bar having two opposite ends wherein one end of the bar is secured to the lower end portion of beam and the other end of the bar is secured to the one elongated side member to accommodate a reclining feature of the seat-supporting section.

10. The assembly as defined in claim 1 further comprising a pair of cross bars extending between and connecting the two elongated side members.

11. A frame assembly for a vehicle seat having a front, a back, a lower back corner and two opposite sides including one side of the seat and the other side of the seat, the assembly comprising:

a seat-supporting section including two elongated side members including one side member and the other side member and arranged in a substantially parallel relationship and extending between the front and the back of the seat so that each side member is provided with a back end, the one side member being disposed adjacent the one side of the seat and the other side member being disposed adjacent the other side of the seat and each of the two side members has a longitudinal axis;

a back-supporting section including an elongated, generally vertically-oriented beam having a longitudinal axis an upper end portion, a lower end and a lower end portion, the beam being disposed adjacent the one side of the seat and joined to the one elongated side member so that the longitudinal axes of the one elongated side member and the beam are coplanar, and the back-supporting section further including a brace member having first and second ends, the first end of the brace member being secured to the beam at a location along the upper end portion thereof, and the second end of the brace member being arranged at a predetermined location adjacent the back of the seat and the other elongated side member; and a first substantially triangular gusset member secured between the lower end portion of the beam and the one elongated side member and a second substantially triangular gusset member secured between the other elongated side member and the second end of the brace member wherein the first gusset member is disposed adjacent the one side of the seat for spanning the lower back corner thereof and is attached to the lower end portion of the beam at a first location therealong which is spaced from the lower end thereof and to the one side member at a second location therealong which is spaced from the back end thereof so that the first gusset member maintains a preselected and nonadjustable spacing between the first and second locations, and wherein the second gusset member is disposed adjacent the other side of the seat for spanning the lower back corner thereof and is attached to the bracing member at the predetermined location and to the other side member at another location therealong which is spaced from the back end thereof so that the second gusset member maintains a preselected and nonadjustable spacing between the predetermined location and the another location.

12. The assembly as defined in claim 11 wherein the predetermined location and the longitudinal axis of the other elongated side member are arranged in a plane which is substantially parallel to the plane in which the longitudinal axes of the one elongated side member and the beam are oriented.

13. The assembly as defined in claim 12 wherein the brace member includes a linear member which extends along a diagonal path from the upper end portion of the beam to the predetermined location, and wherein the diagonal path and the longitudinal axis of the beam are substantially coplanar.

14. The assembly as defined in claim 13 wherein the brace member cooperates with the gusset members and the elongated side members to limit sidewise bending of the beam and torsional effects on the gusset members and the one elongated side member which could otherwise result when the upper end portion of the beam is exposed to sidewise-directed forces and so that the beam is maintained in substantially coplanar alignment with the longitudinal axis of the one elongated side member.

15. The assembly as defined in claim 11 wherein the beam is of greater size and strength than that of the brace.

16. The assembly as defined in claim 11 wherein the one elongated side member is of greater size and strength than that of the other elongated side member.

17. The assembly as defined in claim 11 wherein each of the beam and the one elongated side member has a length and each of the beam and the one elongated side member includes a major section which extends along the length thereof and is substantially U-shaped in cross section and a plate which extends along the length thereof wherein the U of the major section has two legs and an opening therebetween and the plate is attached to so as to cover the opening of the U of the major section.

18. The assembly as defined in claim 11 further including a bar having two opposite ends wherein one end of the bar is secured to the lower end portion of beam and the other end of the bar is secured to the one elongated side member to accommodate a reclining feature of the seat-supporting section.

19. The assembly as defined in claim 11 further comprising a pair of cross bars extending between and connecting the two elongated side members.

20. The assembly as defined in claim 11 in combination with a seat belt assembly including a seat belt for spanning the lap of an occupant of the seat wherein the seat occupant has a torso, and the seat belt assembly further includes a shoulder belt for spanning the torso of the seat occupant.

* * * * *